(12) United States Patent
Kim et al.

(10) Patent No.: US 6,948,326 B2
(45) Date of Patent: Sep. 27, 2005

(54) APPARATUS FOR CONTROLLING OPERATION OF OUTDOOR UNIT AND ITS METHOD

(75) Inventors: In-Gyu Kim, Kyungsangnam-Do (KR); Young-Ju Bae, Kyungsangnam-Do (KR); Ja-Hyung Koo, Kyungsangnam-Do (KR); Byung-Il Park, Kyungsangnam-Do (KR); Kyeong-Ho Kim, Kyungsangnam-Do (KR); Yang-Ho Kim, Kyungsangnam-Do (KR); Young-Ho Hong, Kyungsangnam-Do (KR); Kyeong-Wook Heo, Kyungsangnam-Do (KR); Kang-Wook Cha, Kyungsangnam-Do (KR); Si-Kyong Sung, Kyungsangnam-Do (KR); Dong-Hyuk Lee, Kyungsangnam-Do (KR); Seong-Min Kang, Seoul (KR); Tae-Geun Kim, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 10/472,809

(22) PCT Filed: Jun. 9, 2003

(86) PCT No.: PCT/KR03/01125

§ 371 (c)(1),
(2), (4) Date: Sep. 25, 2003

(87) PCT Pub. No.: WO02/09846

PCT Pub. Date: Jan. 19, 1990

(65) Prior Publication Data

US 2004/0244395 A1 Dec. 9, 2004

(30) Foreign Application Priority Data

Apr. 30, 2003 (KR) .................................. 10-2003-27783
May 15, 2003 (KR) .................................. 10-2003-30992

(51) Int. Cl.$^7$ ............................ F25D 17/00; F25B 1/00; F25B 49/00
(52) U.S. Cl. ........................ 62/181; 62/183; 62/228.1; 62/228.4
(58) Field of Search ..................... 62/178, 180, 181, 62/183, 184, 228.1, 228.3, 228.4

(56) References Cited

U.S. PATENT DOCUMENTS 5,065,593 A * 11/1991 Dudley et al. ................ 62/182
5,666,815 A    9/1997 Aloise ......................... 62/129
6,817,198 B2 * 11/2004 Wilson et al. ............. 62/228.3

FOREIGN PATENT DOCUMENTS

| EP | 0866291 | 9/1998 |
| GB | 2229295 | 9/1990 |
| JP | 03-213928 | 9/1991 |
| JP | 06-101873 | 4/1994 |

* cited by examiner

Primary Examiner—Marc Norman
(74) Attorney, Agent, or Firm—Fleshner & Kim, LLP (57) ABSTRACT

The present invention discloses an apparatus and method for controlling an operation of an outdoor unit which can efficiently control the outdoor unit by mounting sensors on the outdoor unit. The apparatus for controlling the operation of the outdoor unit includes: a pressure sensor for sensing a pressure of refrigerants in an outlet of a compressor of the outdoor unit; a temperature sensor for sensing a temperature of the refrigerants in an outlet of a condenser; and a microcomputer for comparing the pressure from the pressure sensor and the temperature from the temperature sensor with optimal pressure and temperature ranges, and controlling operation conditions of at least a blast fan and the compressor in the outdoor unit to be inversely proportional to each other according to the comparison results.

28 Claims, 9 Drawing Sheets

APPARATUS FOR CONTROLLING OPERATION OF OUTDOOR UNIT AND ITS METHOD

TECHNICAL FIELD

The present invention relates to an apparatus and method for controlling an operation of an outdoor unit, and more particularly to, an apparatus and method for controlling an operation of an outdoor unit which can efficiently control the outdoor unit by mounting sensors on the outdoor unit.

BACKGROUND ART

An air conditioner implying a cooler, a heater or both of them is classified into a window type and a split type. In the case of the cooler, a split type air conditioner includes an indoor unit installed indoors for cooling a room, and an outdoor unit connected to the indoor unit through refrigerant pipe lines and installed outdoors to contact air, for performing condensation heat exchange on a refrigerant gas in a condenser by using external air as a cooling medium, and supplying the condensed refrigerants to an evaporator of the indoor unit through the refrigerant pipe lines. The indoor unit is composed of the evaporator for performing cooling heat exchange for evaporating the refrigerants and absorbing evaporation heat from internal air, and a ventilating fan for circulating internal air, and the outdoor unit is composed of a compressor for compressing the refrigerant gas and supplying the compressed gas to the condenser, the air-cooled condenser for condensing the refrigerant gas from the compressor, and a cooling fan for forcibly ventilating external air to the air-cooled condenser to cool and condense the refrigerant gas. The compressor, the air-cooled condenser and the cooling fan of the outdoor unit are installed in an outdoor unit casing composing the outer appearance. The conventional hexahedral outdoor unit casing has an air suction unit for sucking air to the air-cooled condenser at its three sides, and an air discharge unit for externally discharging air absorbing condensation heat from the refrigerant gas by the heat exchange in the air-cooled condenser on its top surface. However, the conventional outdoor unit for the air conditioner is restricted in installation spaces due to high density and strict environment regulations of cities, and increases civil applications due to noise and heat. Especially, a common residential area such as large-scaled apartment buildings regulates the outdoor units to be installed in indoor verandas to improve the appearance and prevent noise.

In order to solve the foregoing problems, Japanese Laid-Open Patent Publication 6-101873 suggests an air conditioner mounted building where an indoor unit of an air conditioner is installed indoors or adjacent to a room intended to be air-conditioned, and an outdoor unit of the air conditioner is installed outdoors, wherein an opening is formed on the outer wall or roof, a louver is installed in the opening, the outdoor unit of the air conditioner is positioned in the louver, and suction/discharge of the indoor unit is performed through a gap between louver plates.

In addition, Japanese Laid-Open Patent Publication 3-213928 discloses a wall built-in type outdoor unit for an air conditioner including an outdoor unit main body for the air conditioner which is built in the wall and which includes a frame having the same size and thickness as the wall, a suction hole for heat exchange air installed on the same surface as the outdoor unit main body, and a discharge hole for heat exchanged air.

However, the conventional arts have never suggested an apparatus and method for deciding whether an outdoor unit is operated under operation setup conditions set by a user through an indoor unit.

The conventional arts have never taught an apparatus and method for controlling an outdoor unit to satisfy operation setup conditions, regardless of external variation factors (external temperature, wind velocity, etc.).

Moreover, the conventional arts have never mentioned a technical structure and method for measuring variations of a pressure of sucked and discharged air, when an outdoor unit or louver unit has errors. The outdoor unit is continuously operated because such errors are not sensible. As a result, the outdoor unit may get out of order.

DISCLOSURE OF THE INVENTION

An object of the present invention is to provide an apparatus and method for controlling an operation of an outdoor unit which can decide whether the outdoor unit is operated under operation setup conditions set by a user or automatically set through an indoor unit.

Another object of the present invention is to provide an apparatus and method for controlling an operation of an outdoor unit which can satisfy operation setup conditions regardless of external variation factors (external temperature, wind velocity, etc.), and achieve optimal efficiency (operation state).

Yet another object of the present invention is to provide an apparatus and method for controlling an operation of an outdoor unit which can sense variations of a pressure of air sucked and/or discharged through the outdoor unit.

Yet another object of the present invention is to provide an apparatus and method for controlling an operation of an outdoor unit which can apply various decision standards by sensing variations of an air pressure.

Yet another object of the present invention is to provide an apparatus and method for controlling an operation of an outdoor unit which can protect the outdoor unit by sensing an error at the inside/outside of the outdoor unit, and rapidly interrupting the operation of the outdoor unit.

In order to achieve the above-described objects of the invention, there is provided an apparatus for controlling an operation of an outdoor unit, including: a pressure sensor for sensing a pressure of refrigerants in an outlet of a compressor of the outdoor unit; a temperature sensor for sensing a temperature of the refrigerants in an outlet of a condenser; and a microcomputer for comparing the pressure from the pressure sensor and the temperature from the temperature sensor with optimal pressure and temperature ranges, and controlling operation conditions of at least a blast fan and the compressor in the outdoor unit to be inversely proportional to each other according to the comparison results.

Preferably, when the pressure and temperature exist within the optimal pressure and temperature ranges, the microcomputer maintains the current operation conditions of the compressor and the condenser.

Preferably, when the pressure and temperature are lower than the optimal pressure and temperature ranges, the microcomputer decreases a revolution number of the blast fan by a predetermined value, and increases an operation frequency of the compressor by a predetermined value.

Preferably, when the pressure and temperature are higher than the optimal pressure and temperature ranges, the microcomputer increases the revolution number of the blast fan by a predetermined value, and decreases the operation frequency of the compressor by a predetermined value.

Preferably, the optimal pressure and temperature ranges are determined under operation setup conditions of an indoor unit.

Preferably, the microcomputer sets initial operation conditions of the blast fan and the compressor under the operation setup conditions of the indoor unit, and operates the blast fan and the compressor.

Preferably, the apparatus further includes a pressure measuring means installed in the outdoor unit, for measuring a first pressure of air.

Preferably, the microcomputer stores a critical pressure of the outdoor unit, compares the pressure measured by the pressure measuring means with the stored critical pressure, and interrupts the operation of the outdoor unit according to the comparison result.

Preferably, the pressure measuring means includes a first pressure sensor installed in a discharge area of the outdoor unit, for measuring a first pressure of discharged air, and the critical pressure is a reference for discharged air of the outdoor unit.

Preferably, when the first pressure is lower than the critical pressure, the microcomputer interrupts the whole operation of the outdoor unit.

Preferably, the pressure measuring means further includes: a second pressure sensor installed in a suction area of the outdoor unit, for measuring a second pressure of sucked air; and a wind pressure switch for inputting a differential pressure between the first pressure and the second pressure into the microcomputer.

Preferably, the microcomputer further stores a critical differential pressure between the pressure of discharged air of the outdoor unit and the pressure of sucked air, compares the differential pressure inputted by the wind pressure switch with the critical differential pressure, and interrupts the whole operation of the outdoor unit when the inputted differential pressure is equal to or higher than the critical differential pressure.

Preferably, the microcomputer transmits an outdoor unit interruption message to the indoor unit after interrupting the outdoor unit.

According to another aspect of the invention, an apparatus for controlling an operation of an outdoor unit includes: a pressure measuring means installed in the outdoor unit, for measuring a first pressure of air; and a microcomputer for storing a critical pressure of the outdoor unit, comparing the pressure measured by the pressure measuring means with the stored critical pressure, and interrupting the operation of the outdoor unit according to the comparison result.

Preferably, the pressure measuring means includes a first pressure sensor installed in a discharge area of the outdoor unit, for measuring a first pressure of discharged air, and the critical pressure is a reference for discharged air of the outdoor unit.

Preferably, when the first pressure is lower than the critical pressure, the microcomputer interrupts the whole operation of the outdoor unit.

Preferably, the pressure measuring means further includes: a second pressure sensor installed in a suction area of the outdoor unit, for measuring a second pressure of sucked air; and a wind pressure switch for inputting a differential pressure between the first pressure and the second pressure into the microcomputer.

Preferably, the microcomputer further stores a critical differential pressure between the pressure of discharged air of the outdoor unit and the pressure of sucked air, compares the differential pressure inputted by the wind pressure switch with the critical differential pressure, and interrupts the whole operation of the outdoor unit when the inputted differential pressure is equal to or higher than the critical differential pressure.

Preferably, the microcomputer transmits an outdoor unit interruption message to an indoor unit after interrupting the outdoor unit.

According to another aspect of the invention, a method for controlling an operation of an outdoor unit includes the steps of: sensing a pressure of refrigerants in an outlet of a compressor of the outdoor unit; sensing a temperature of the refrigerants in an outlet of a condenser; comparing the sensed pressure and temperature with optimal pressure and temperature ranges; when the pressure and temperature exist within the optimal pressure and temperature ranges, maintaining the current operation conditions of a blast fan and the compressor of the outdoor unit; when the pressure and temperature are lower than the optimal pressure and temperature ranges, decreasing a revolution number of the blast fan by a predetermined value, and increasing an operation frequency of the compressor by a predetermined value; and when the pressure and temperature are higher than the optimal pressure and temperature ranges, increasing the revolution number of the blast fan by a predetermined value, and decreasing the operation frequency of the compressor by a predetermined value.

Preferably, the method further includes a step for setting the optimal pressure and temperature ranges under operation setup conditions of an indoor unit.

Preferably, the method further includes a step for setting initial operation conditions of the blast fan and the compressor under the operation setup conditions of the indoor unit, and operating the blast fan and the compressor.

Preferably, the method further includes the steps of: measuring a first pressure of air of the outdoor unit; comparing a critical pressure of the outdoor unit with the first pressure; and interrupting the operation of the outdoor unit according to the comparison result.

Preferably, the step for measuring the first pressure measures a pressure of discharged air in a discharge area of the outdoor unit, and the critical pressure is a reference for discharged air of the outdoor unit.

Preferably, when the current pressure is lower than the critical pressure, the interrupting step interrupts the whole operation of the outdoor unit.

Preferably, the method further includes the steps of: measuring a second pressure of sucked air in a suction area of the outdoor unit; and calculating a differential pressure between the first pressure and the second pressure.

Preferably, the method further includes a step for comparing a critical differential pressure between the pressure of discharged air of the outdoor unit and the pressure of sucked air with the differential pressure, wherein, when the differential pressure is equal to or higher than the critical differential pressure, the whole operation of the outdoor unit is interrupted.

Preferably, the method further includes a step for transmitting an outdoor unit interruption message to the indoor unit after interrupting the outdoor unit.

According to another aspect of the invention, a method for controlling an operation of an outdoor unit includes the steps of: measuring a first pressure of air of the outdoor unit; comparing a critical pressure of the outdoor unit with the first pressure; and interrupting the operation of the outdoor unit according to the comparison result.

Preferably, the step for measuring the first pressure measures a pressure of discharged air in a discharge area of the outdoor unit, and the critical pressure is a reference for discharged air of the outdoor unit.

Preferably, when the current pressure is lower than the critical pressure, the interrupting step interrupts the whole operation of the outdoor unit.

Preferably, the method further includes the steps of: measuring a second pressure of sucked air in a suction area of the outdoor unit; and calculating a differential pressure between the first pressure and the second pressure.

Preferably, the method further includes a step for comparing a critical differential pressure between the pressure of discharged air of the outdoor unit and the pressure of sucked air with the differential pressure, wherein, when the differential pressure is equal to or higher than the critical differential pressure, the whole operation of the outdoor unit is interrupted Preferably, the method further includes a step for transmitting an outdoor unit interruption message to an indoor unit after interrupting the outdoor unit.

BEST MODE FOR CARRYING OUT THE INVENTION

An apparatus and method for controlling an operation of an outdoor unit in accordance with the present invention will now be described in detail with reference to the accompanying drawings.

Figure 1:
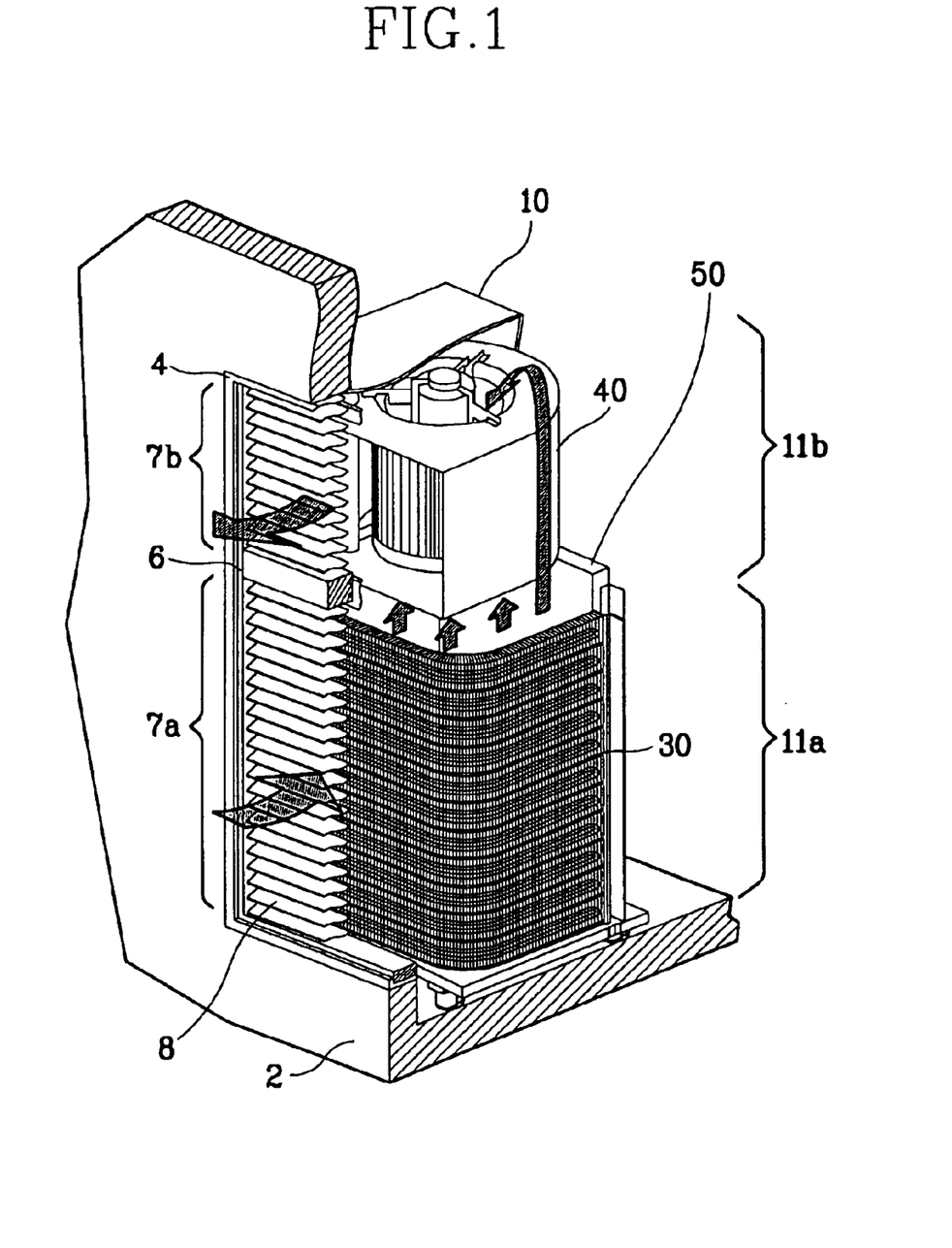
FIG. 1 is a partially-cut perspective-sectional view illustrating a built-in type outdoor unit for an air conditioner in which an apparatus for controlling an operation of the outdoor unit is installed in accordance with a preferred embodiment of the present invention.
Figure 2:
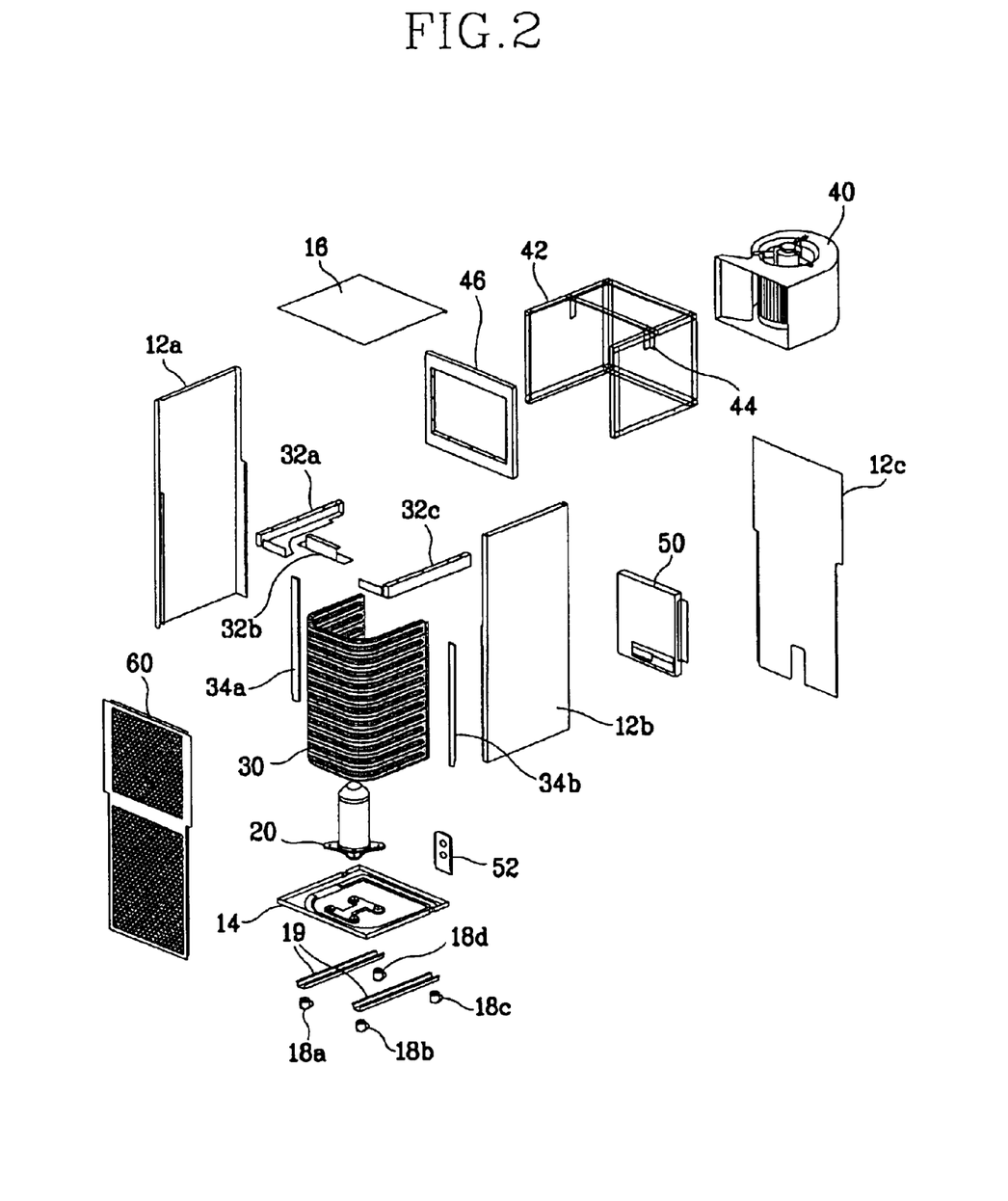
FIG. 2 is a perspective view illustrating disassembly of the outdoor unit of FIG. 1.

FIGS. 1 and 2 are structure views illustrating a built-in type outdoor unit for an air conditioner in which the apparatus for controlling the operation of the outdoor unit is installed in accordance with the present invention.

As illustrated in FIGS. 1 and 2, an external frame 4 is fixedly installed on a rectangular space inner wall formed on an outer wall 2 of a residential and/or commercial building, and an internal frame 6 is fixedly installed at the inside of the external frame 4. The internal and external frames 4 and 6 can be incorporated. An inside area of the internal frame 6 is divided into a suction area 7a and a discharge area 7b. A plurality of louver blades 8 are installed in each area, so that air can be sucked or discharged through gaps between the louver blades 8. Hereinafter, the external frame 4, the internal frame 6 and the louver blades 8 are referred to as a louver frame.

On the other hand, an outdoor unit 10 (partially shown) fixedly installed at he inside of the outer wall 2 of the building to contact with the external frame 4 and/or internal frame 6 includes an outdoor unit casing. The outdoor unit casing opens its one side facing the suction area 7a and the discharge area 7b of the internal frame 6. The opened side is divided into a suction unit 11a and a discharge unit 11b to correspond to the suction area 7a and the discharge area 7b of the internal frame 6.

The outdoor unit 10 fixedly installed at the inside of the outer wall 2 of the building to contact with the external frame 4 and/or internal frame 6 includes the outdoor unit casing composed of components of FIG. 2. In addition, outdoor unit components of FIG. 2 are installed in the outdoor unit casing.

In the outdoor unit casing, one side facing the suction area 7a and the discharge area 7b of the internal frame 6 is opened. The opened side is divided into the suction unit 11a and the discharge unit 11b to correspond to the suction area 7a and the discharge area 7b of the internal frame 6. In addition, three side covers 12a, 12b and 12c, a bottom cover 14 and a top cover 16 are closed to form a rectangular parallelepiped. A plurality of leg members 18a, 18b, 18c and 18d are externally protruded from the bottom cover 14. The leg members 18a, 18b, 18c and 18d are installed on the bottom of a building, for example a veranda of an apartment building, for supporting heavy load of the outdoor unit 10. Preferably, four leg members 18a, 18b, 18c and 18d are formed in consideration of the shape of the bottom cover 14. Leg reinforcing members 19 for connecting and reinforcing the leg members 18a, 18b, 18c and 18d are formed below the bottom cover 14 in the horizontal direction. The leg members 18a, 18b, 18c and 18d further include bolts (not shown) for controlling height. Accordingly, when the bottom of the building, for example the veranda of the apartment building is not flat, they can stably position the outdoor unit 10. When the two leg members 18a and 18b positioned in the forward direction (toward building outer wall) among the leg members 18a, 18b, 18c and 18d further include transport wheels (not shown), it is much easier to transport the heavy load outdoor unit 10.

In the outdoor unit suction unit 11a, a compressor 20 is installed on a compressor fastening unit 22, and a 'U' shaped air-cooled condenser 30 is fixedly supported on the side covers 12a and 12b and the bottom cover 14 by using condenser covers 32a, 32b and 32c and condenser brackets 34a and 34b. In the air-cooled condenser 30, a plurality of condenser pipe lines are formed in a zigzag shape between a plurality of condenser fins. The structure and shape of the aircooled condenser 30 have been publicly known, and thus are not shown in detail. A refrigerant gas compressed by the compressor 20 is transmitted through the pipelines of the condenser 30, removed its condensed heat by externally-supplied air, and condensed. In this case, the condenser covers 32a, 32b and 32c and the condenser brackets 34a and 34b form a wind path so as to prevent external air from being supplied to the discharge unit 11b not via the condenser 30.

The outdoor unit further includes a pressure sensor (not shown) for sensing a pressure of refrigerants discharged from the compressor 20 to the condenser 30, and a temperature sensor (not shown) for sensing a temperature of the refrigerants supplied to the condenser 30 and heat exchanged by air. Preferably, the pressure sensor is installed near a discharge hole (not shown) of the compressor 20, and the temperature sensor is installed near a manifold of the condenser 30 discharging the refrigerants.

In the outdoor unit discharge unit 11b, a blast fan 40 for supplying external air to the air-cooled condenser 30 through the suction area 7a and discharging heat exchanged air through the discharge area 7b is fixedly installed on the side covers 12a, 12b and 12c and the top cover 16 by a blast fan supporting member 42, a blast fan bracket 44 and a fan front 46. Here, a sirocco fan is used as the blast fan 40.

A control box 50 for controlling the operation of the outdoor unit 10 is installed at the inside of the side cover 12c composing the rear surface among the side covers, and refrigerant pipe lines which the refrigerant gas evaporated in an indoor unit is sucked through, and a valve assembly 52, a path of the refrigerant pipe lines which the refrigerants condensed in the outdoor unit 10 are discharged through are installed below the control box 50.

The control box 50 includes a microcomputer (not shown) for controlling at least the compressor 20 and the blast fan 40, which will later be explained.

A mesh shaped front grill 60 is installed on the front surface of the outdoor unit 10, namely one opened side facing the suction area 7a and the discharge area 7b of the internal frame 6 to prevent invasion of animals (for example, rats).

Figure 3:
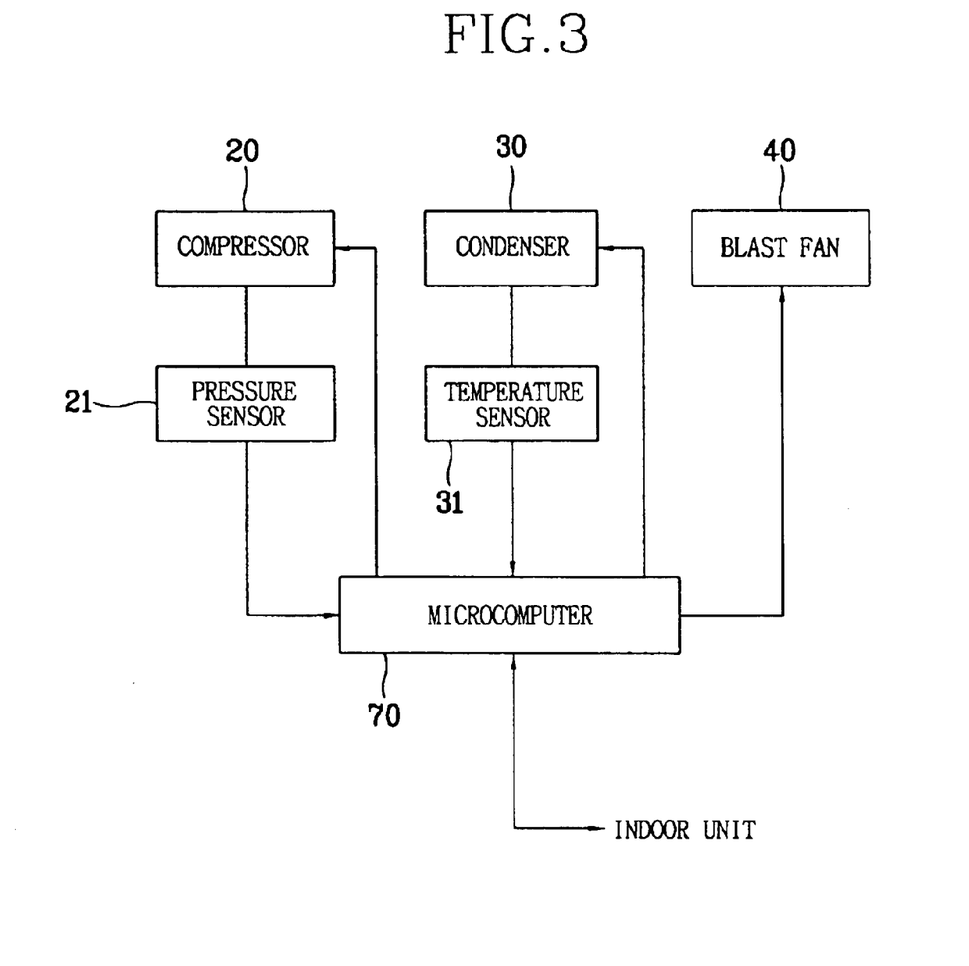
FIG. 3 is a structure view illustrating the apparatus for controlling the operation of the outdoor unit in accordance with the present invention.

FIG. 3 is a structure view illustrating the apparatus for controlling the operation of the outdoor unit in accordance with the present invention. Referring to FIG. 3, the apparatus for controlling the operation of the outdoor unit includes a pressure sensor 21 installed in the compressor 20, for sensing a pressure of discharged refrigerants, a temperature sensor 31 installed in the condenser 30, for sensing a temperature of heat exchanged refrigerants, and a microcomputer 70 installed in the control box 50, for receiving the pressure and temperature from the pressure sensor 21 and the temperature sensor 31, comparing the pressure and temperature with optimal pressure and temperature ranges, and controlling at least the compressor 20 and the blast fan 40 according to the comparison results.

In addition, the microcomputer 70 receives operation setup conditions (for example, indoor temperature automatically set or set by the user, humidity, etc.) from a control apparatus (not shown) of the indoor unit. Here, the microcomputer 70 previously stores the optimal pressure and temperature ranges of the compressor 20 and the condenser 30 under various operation setup conditions, and also stores operation conditions corresponding to the optimal pressure and temperature ranges, such as a revolution number of the blast fan 40 and an operation frequency of the compressor 20. Such operation conditions are determined in accordance with general external conditions including a temperature and wind velocity in a place in which the outdoor unit 10 has been installed. Conversely, the external conditions in the installation place of the outdoor unit 10 are possibly different from general external conditions. Accordingly, refrigerants having a wanted pressure and temperature may not be obtained by operating the outdoor unit 10 under the previously-stored operation conditions. The present invention is intended to obtain high performance by removing detrimental effects of the external conditions on the outdoor unit 10.

When the microcomputer 70 receives the operation setup conditions from the control apparatus of the indoor unit, the microcomputer 70 searches initial operation conditions of the compressor 20 and the blast fan 40 under the operation setup conditions, and operates the compressor 20 and the blast fan 40 under the operation conditions.

Figure 4:
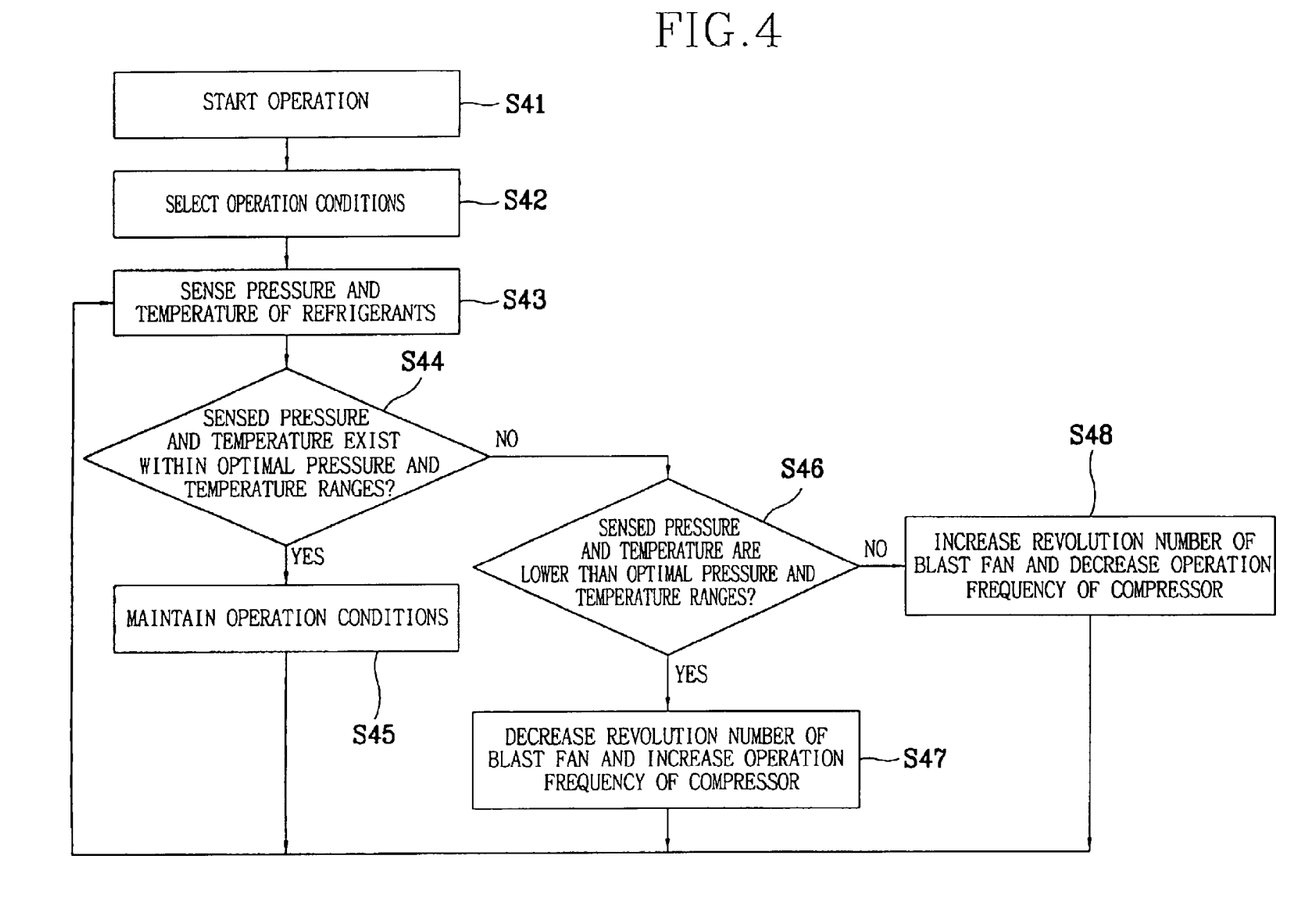
FIG. 4 is a flowchart showing sequential steps of a method for controlling the operation of the outdoor unit in accordance with the present invention.

FIG. 4 is a flowchart showing sequential steps of the method for controlling the operation of the outdoor unit in accordance with the present invention. This method is implemented by the above-described apparatus, and includes a step S41 for receiving operation setup conditions at the microcomputer 70 driven by the control apparatus of the indoor unit, a step S42 for selecting, at the microcomputer 70, initial operation conditions corresponding to the operation setup conditions from the control apparatus of the indoor unit, a step S43 for respectively sensing, at the pressure sensor 21 and the temperature sensor 31, a pressure of refrigerants of the compressor 20 and a temperature of refrigerants of the condenser 30, a step S44 for deciding, at the microcomputer 70, whether the sensed pressure and temperature exist within optimal pressure and temperature ranges corresponding to the operation setup conditions, a step S45 for maintaining the current operation conditions, when the sensed pressure and temperature exist within the optimal pressure and temperature ranges, a step S46 for deciding whether the sensed pressure and temperature are lower than optimal pressure and temperature ranges, a step S47 for decreasing a revolution number of the blast fan 40 and increasing an operation frequency of the compressor 20 to be inversely proportional to each other, when the sensed pressure and temperature are lower than the optimal pressure and temperature ranges, and a step S48 for increasing the revolution number of the blast fan 40 and decreasing the operation frequency of the compressor 20 to be inversely proportional to each other, when the sensed pressure and temperature are higher than the optimal pressure and temperature ranges.

In detail, in S41, when the indoor unit is operated by the user and the operation setup conditions are automatically set or set by the user, the control apparatus of the indoor unit transmits the operation setup conditions to the microcomputer 70 to start the operation of the outdoor unit 10.

In S42, the microcomputer 70 selects the operation conditions previously stored to correspond to the operation setup conditions, including the revolution number of the blast fan 40 and the operation frequency of the compressor 20, and operates the blast fan 40 and the compressor 20 under the operation conditions. Here, the microcomputer 70 selects the optimal pressure and temperature ranges of the compressor 20 and the condenser 30 corresponding to the operation setup conditions (operation conditions).

In S43, the pressure sensor 21 senses the pressure of refrigerants discharged from the compressor 20, and the temperature sensor 31 senses the temperature of refrigerants heat exchanged in the condenser 30. The pressure sensor 21 and the temperature sensor 31 transmit the pressure and temperature to the microcomputer 70.

In S44, the microcomputer 70 decides whether the sensed pressure and temperature exist within the optimal pressure and temperature ranges as one of the steps for comparing the sensed pressure and temperature with the optimal pressure and temperature ranges. When the sensed pressure and temperature exist within the optimal pressure and temperature ranges, the compressor 20 and the blast fan 40 are efficiently operated under the operation setup conditions. Thus, the microcomputer 70 continuously operates the compressor 20 and the blast fan 40 under the current operation conditions (S45).

In S46, the microcomputer 70 decides whether the sensed pressure and temperature are lower than the optimal pressure and temperature ranges as one of the steps for comparing the sensed pressure and temperature with the optimal pressure and temperature ranges. If so, the microcomputer 70 decreases the revolution number of the blast fan 40 by a predetermined value, and increases the operation frequency of the compressor 20 by a predetermined value according to the comparison results (S47).

In S48, when the sensed pressure and temperature are higher than the optimal pressure and temperature ranges, the microcomputer 70 increases the revolution number of the blast fan 40 by a predetermined value, and decreases the operation frequency of the compressor 20 by a predetermined value according to the comparison results.

When a predetermined period of time elapses after the steps S45, S47 and S48 at the microcomputer 70, S43 is repeated, to perform the method for controlling the operation of the outdoor unit to satisfy the operation setup conditions.

Figure 5A:
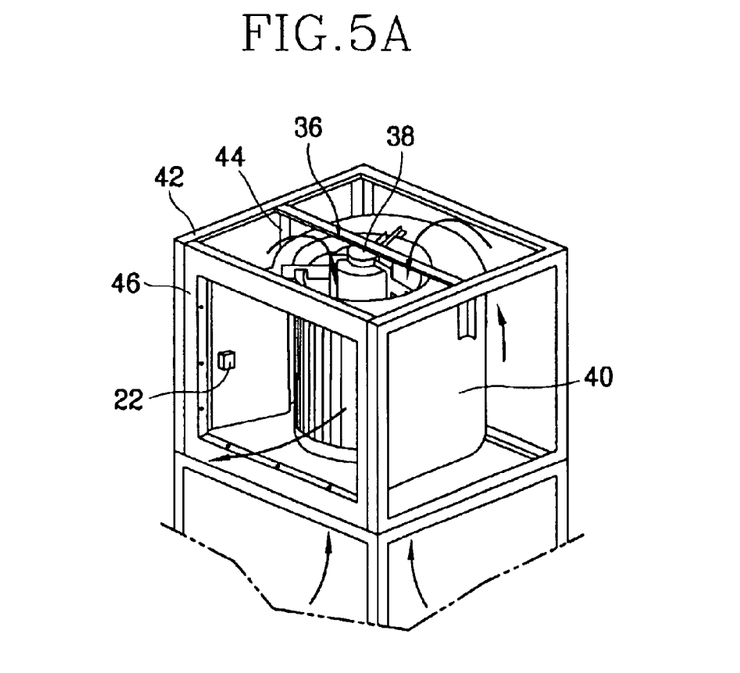
FIGS. 5A and 5B are a partial perspective view and a structure view illustrating an outdoor unit in which an apparatus for controlling an operation of the outdoor unit is installed in accordance with a second embodiment of the present invention.
Figure 5B:
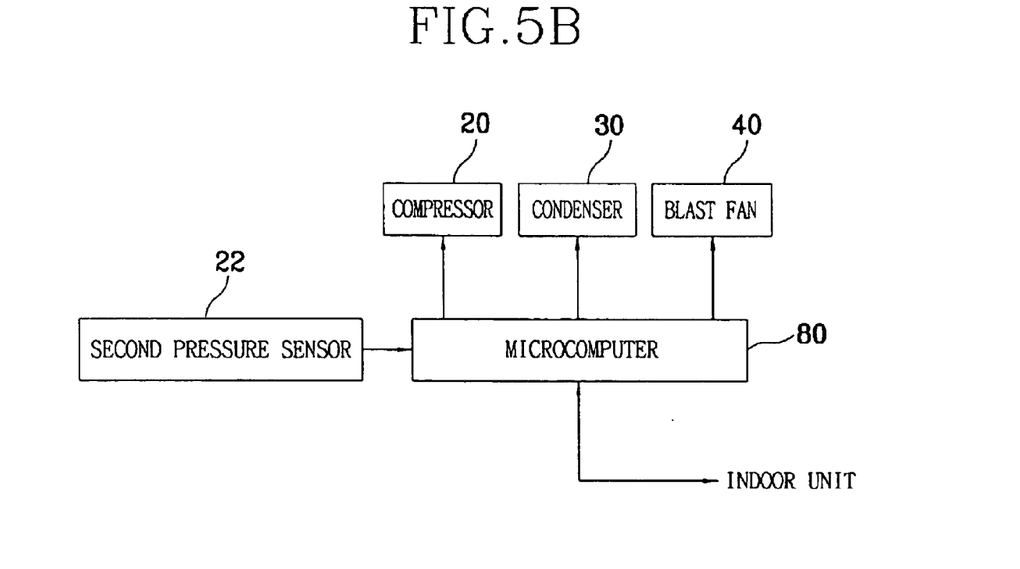

FIGS. 5A and 5B are a partial perspective view and a structure view illustrating an outdoor unit in which an apparatus for controlling an operation of the outdoor unit is installed in accordance with a second embodiment of the present invention.

As depicted in FIG. 5A, a second pressure sensor 70 is installed at the inside of a discharge unit of a housing of a blast fan 40. As shown in FIG. 5B, the apparatus for controlling the operation of the outdoor unit includes a second pressure sensor 22 installed in a discharge unit of a blast fan 40, for measuring a pressure of discharged air of the outdoor unit 10, and a microcomputer 80 for interrupting the whole operation of the outdoor unit 10, for example, the operations of a compressor 20, a condenser 30 and the blast fan 40 according to the pressure measured by the second pressure sensor 22. In addition, the microcomputer 80 is connected to perform bidirectional communication with an indoor unit.

The second pressure sensor 22 can be installed in other positions suitable to measure the pressure of discharged air in the discharge unit 11b of the outdoor unit 10.

The microcomputer 80 includes a built-in memory (not shown), stores a critical pressure of discharged air of the outdoor unit 10 in the memory, compares the critical pressure with the pressure measured by the second pressure sensor 22, and controls the whole operation of the outdoor unit 10.

Figure 6:
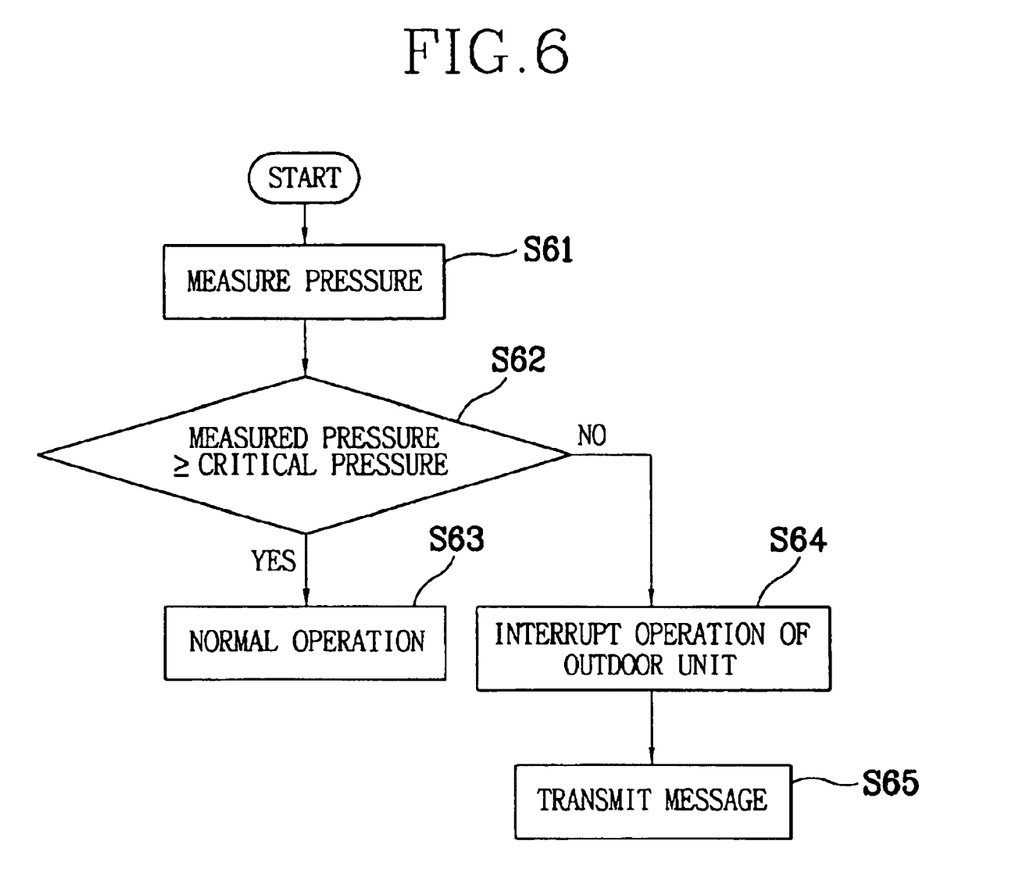
FIG. 6 is a flowchart showing sequential steps of a method for controlling the operation of the outdoor unit in accordance with the second embodiment of the present invention.

FIG. 6 is a flowchart showing sequential steps of a method for controlling the operation of the outdoor unit in accordance with the second embodiment of the present invention. Here, the method of FIG. 6 can be implemented by the apparatus of FIG. 5B or other apparatuses performing similar operations.

The method for controlling the operation of the outdoor unit includes a step S61 for measuring a pressure at the second pressure sensor 22, a step S62 for comparing the measured pressure with the critical pressure, a step S63 for normally operating the outdoor unit 10, when the measured pressure is equal to or higher than the critical pressure, a step S64 for interrupting the whole operation of the outdoor unit 10, when the measured pressure is lower than the critical pressure, and a step S65 for transmitting an outdoor unit interruption message to the indoor unit.

In detail, in S61, the microcomputer 80 receives the pressure from the second pressure sensor 22, and reads the critical pressure from the memory.

In S62, the microcomputer 80 compares the measured pressure with the critical pressure. When the measured pressure is equal to or higher than the critical pressure, the microcomputer 80 decides that the outdoor unit 10 and louver frame do not have errors, and goes to S63 to normally operate the outdoor unit 10.

However, when the measured pressure is lower than the critical pressure, the microcomputer 80 decides that the outdoor unit 10 has errors (for example, operation failure of the condenser 30 or blast fan 40), louver blades 8 of the louver frame are closed, or air is not smoothly discharged from the discharge unit 11b due to a high external wind velocity, goes to S63 to interrupt the whole operation of the outdoor unit 10, and transmits the outdoor unit interruption message to the indoor unit (S65).

Figure 7A:
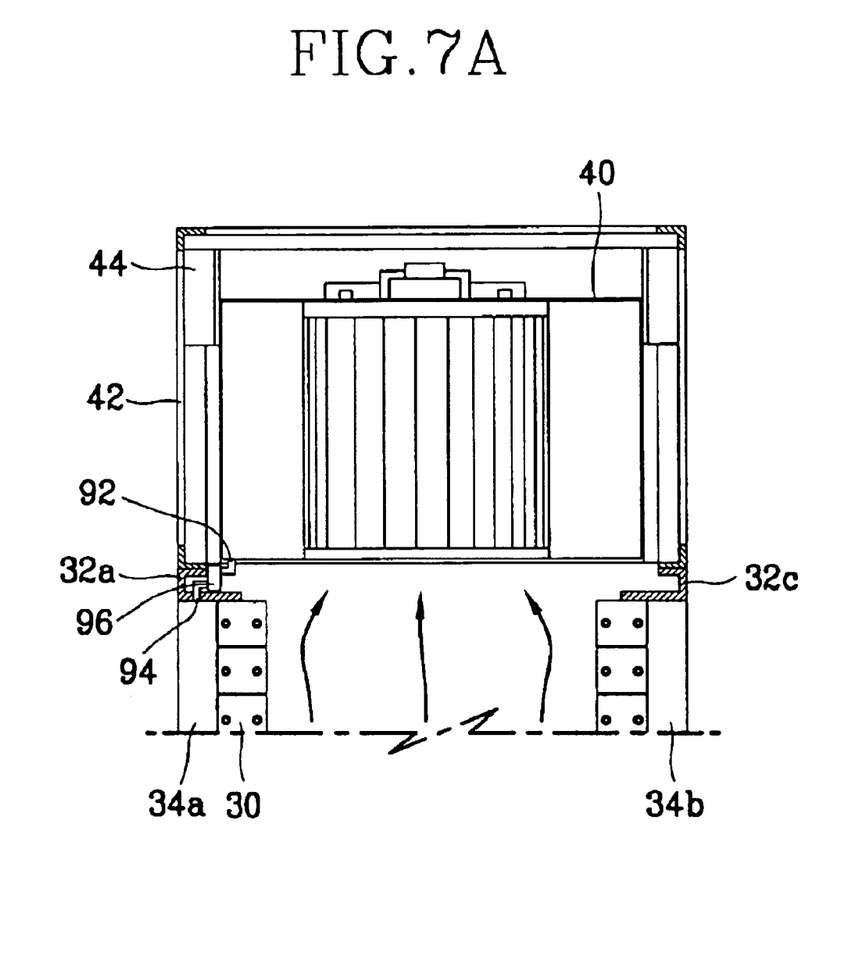
FIGS. 7A and 7B are a partial cross-sectional view and a structure view illustrating an outdoor unit in which an apparatus for controlling an operation of the outdoor unit is installed in accordance with a third embodiment of the present invention.
Figure 7B:
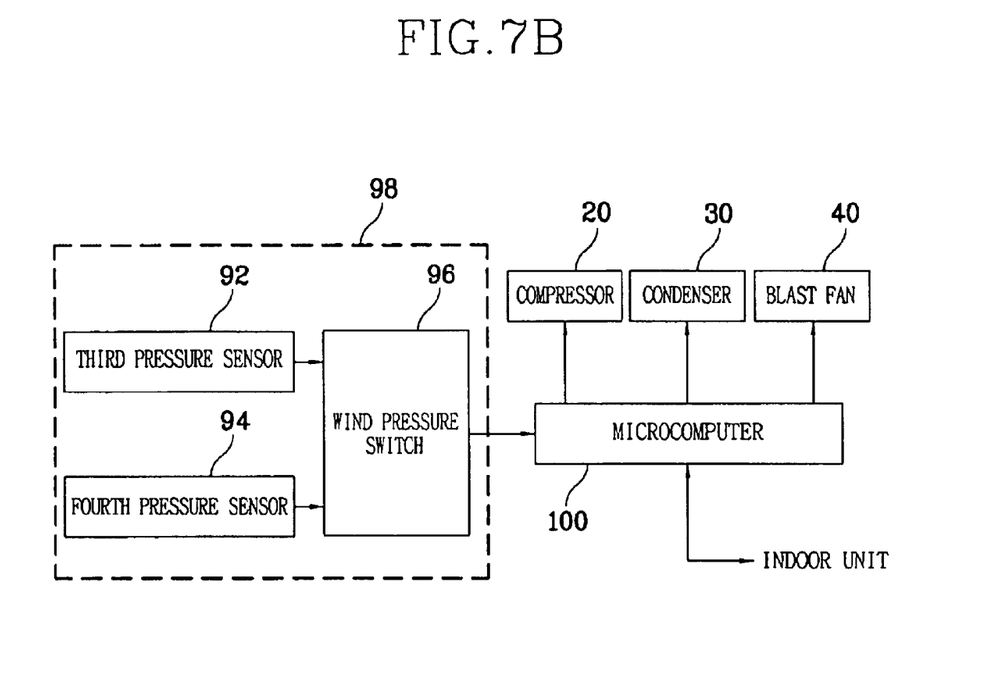

FIGS. 7A and 7B are a partial cross-sectional view and a structure view illustrating an outdoor unit in which an apparatus for controlling an operation of the outdoor unit is installed in accordance with a third embodiment of the present invention.

Referring to FIG. 7A, the apparatus for controlling the operation of the outdoor unit includes a third pressure sensor 92 installed through a housing of a blast fan 40, for measuring a pressure of discharged air (third pressure) in a discharge unit 11b of the outdoor unit 10, a fourth sensor 94 installed through a condenser cover 32a, for measuring a pressure of sucked air (fourth pressure) in a suction unit 11a of the outdoor unit 10, and a wind pressure switch 96 connected to the third pressure sensor 92 and the fourth pressure sensor 94, for calculating a differential pressure between the third pressure and the third pressure. The third pressure sensor 92, the fourth pressure sensor 94 and the wind pressure switch 96 are referred to as a pressure measuring means.

The third pressure sensor 92 and the fourth pressure sensor 94 may be formed as single pressure sensors to respectively measure the pressure, or formed as a tube to induce air to the wind pressure switch 96 and respectively measure the pressure.

As shown in FIG. 7B, the apparatus includes a microcomputer 100 for receiving the differential pressure from the pressure measuring means 98, and controlling the whole operation of the outdoor unit 10.

The microcomputer 100 has a built-in memory (not shown), stores a critical differential pressure for the differential pressure between the pressure of the discharge unit 11b and the pressure of the suction unit 11a in the memory, compares the critical differential pressure with the differential pressure from the pressure measuring means 98, and controls the whole operation of the outdoor unit 10.

Figure 8:
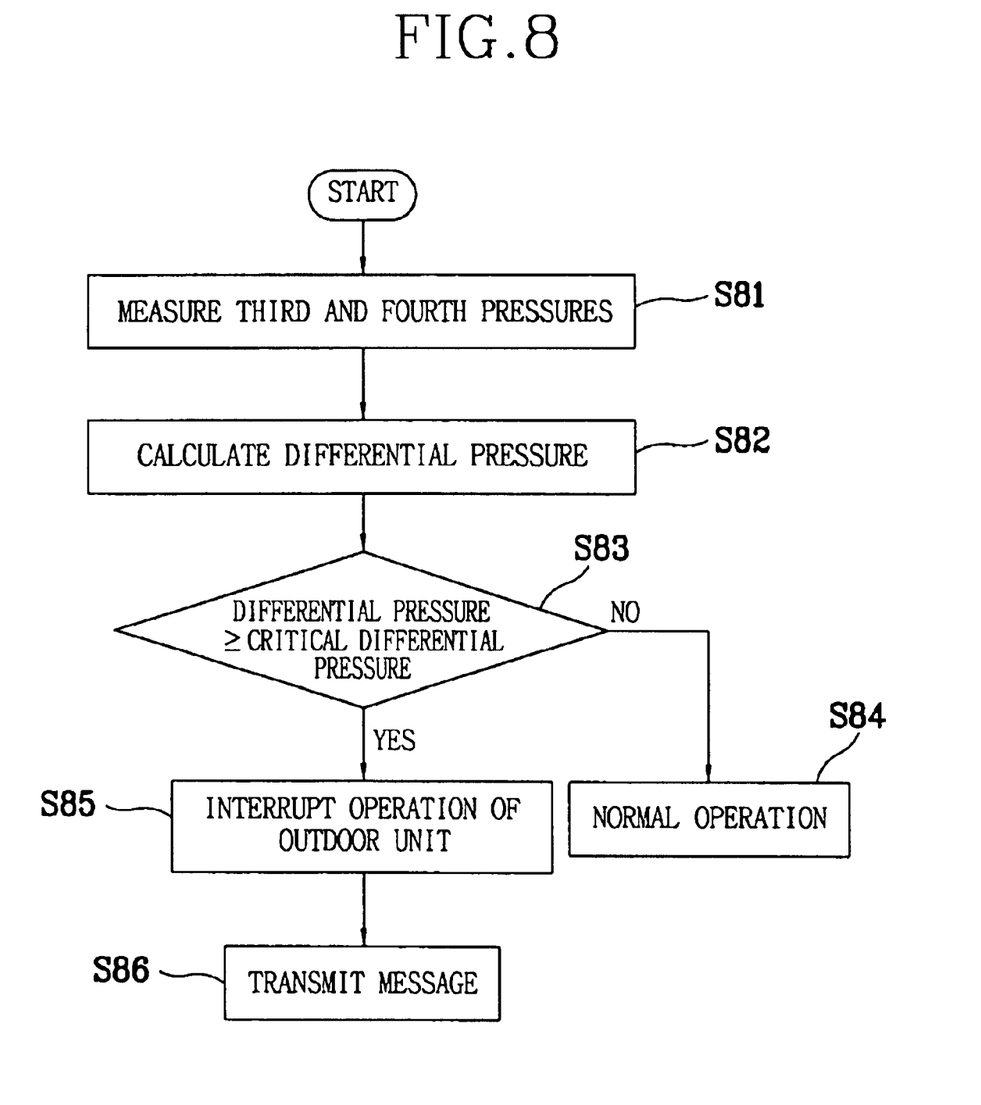
FIG. 8 is a flowchart showing sequential steps of a method for controlling the operation of the outdoor unit in accordance with the third embodiment of the present invention.

FIG. 8 is a flowchart showing sequential steps of a method for controlling the operation of the outdoor unit in accordance with the third embodiment of the present invention. Here, the method of FIG. 8 can be implemented by the apparatus of FIG. 7B or other apparatuses performing similar operations.

The method for controlling the operation of the outdoor unit includes a step S81 for measuring the third pressure and the fourth pressure, a step S82 for calculating the differential pressure between the third pressure and the fourth pressure, a step S83 for comparing the differential pressure with the critical differential pressure, a step S84 for normally operating the outdoor unit 10, when the differential pressure is lower than the critical differential pressure, a step S85 for interrupting the whole operation of the outdoor unit 10, when the differential pressure is equal to or higher than the critical differential pressure, and a step S86 for transmitting an outdoor unit interruption message to an indoor unit.

In detail, in S81, the third pressure sensor 92 and the fourth pressure sensor 94 of the pressure measuring means 98 measure the pressure of air in each position, and transmits the third pressure and the fourth pressure to the wind pressure switch 96.

In S82, the pressure measuring means 98 calculates the differential pressure between the third pressure and the fourth pressure, and transmits the differential pressure to the microcomputer 100. The microcomputer 100 reads the critical differential pressure from the memory.

In S83, the microcomputer 100 compares the differential pressure with the critical differential pressure. When the differential pressure is lower than the critical differential pressure, the microcomputer 100 decides that the outdoor unit 10 and louver frame do not have errors, and goes to S84 to normally operate the outdoor unit 10.

However, when the differential pressure is equal to or higher than the critical differential pressure (namely, when a difference between the air pressure of the discharge unit 11b and the air pressure of the suction unit 11a is great), the microcomputer 100 decides that the outdoor unit 10 has errors (for example, operation failure of the condenser 30 or blast fan 40), louver blades 8 of the louver frame are closed, or air is not smoothly discharged from the discharge unit 11b due to a high external wind velocity, goes to S85 to interrupt the whole operation of the outdoor unit 10, and transmits the outdoor unit interruption message to the indoor unit (S86).

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An apparatus for controlling an operation of an a compressor/condenser unit, comprising:
   a pressure sensor for sensing a pressure of refrigerants in an outlet of a compressor of the compressor/condenser unit;
   a temperature sensor for sensing a temperature of the refrigerants in an outlet of a condenser; and
   a microcomputer for comparing the pressure from the pressure sensor and the temperature from the temperature sensor with optimal pressure and temperature ranges, and controlling operation conditions of at least a blast fan and the compressor in the compressor/condenser unit to be inversely proportional to each other according to the comparison results.

2. The apparatus of claim 1, wherein, when the pressure and temperature exist within the optimal pressure and temperature ranges, the microcomputer maintains the current operation conditions of the compressor and the condenser.

3. The apparatus of claim 1, wherein, when the pressure and temperature are lower than the optimal pressure and temperature ranges, the microcomputer increases a revolution number of the blast fan by a predetermined value, and decreases an operation frequency of the compressor by a predetermined value.

4. The apparatus of claim 1, wherein, when the pressure and temperature are higher than the optimal pressure and temperature ranges, the microcomputer decreases a revolution number of the blast fan by a predetermined value, and increases an operation frequency of the compressor by a predetermined value.

5. The apparatus of claim 1, wherein the optimal pressure and temperature ranges are determined under operation setup conditions of an indoor unit.

6. The apparatus of claim 5, wherein the microcomputer sets initial operation conditions of the blast fan and the compressor under the operation setup conditions of the indoor unit, and operates the blast fan and the compressor.

7. The apparatus of claim 6, wherein the indoor unit includes an evaporator.

8. The apparatus of claim 5, wherein the indoor unit includes an evaporator.

9. The apparatus of claim 1, further comprising a pressure sensor installed in the compressor/condenser unit for measuring a first pressure of air.

10. The apparatus of claim 9, wherein the microcomputer stores a critical pressure of the compressor/condenser unit, compares the pressure measured by the pressure sensor with the stored critical pressure, and interrupts the operation of the compressor/condenser unit according to the comparison result.

11. The apparatus of claim 10, wherein the pressure sensor comprises a first pressure sensor installed in a discharge area of the compressor/condenser unit, for measuring a first pressure of discharged air, and wherein the critical pressure is a reference for discharged air of the compressor/condenser unit.

12. The apparatus of claim 11, wherein, when the first pressure is lower than the critical pressure, the microcomputer interrupts the whole operation of the compressor/condenser unit.

13. The apparatus of claim 11, wherein the pressure sensor further comprises:
    a second pressure sensor installed in a suction area of the compressor/condenser unit; for measuring a second pressure of sucked air; and
    a wind pressure switch for inputting a differential pressure between the first pressure and the second pressure into the microcomputer.

14. The apparatus of claim 13, wherein the microcomputer further stores a critical differential pressure between the pressure of discharged air of the compressor/condenser unit and the pressure of sucked air, compares the differential pressure inputted by the wind pressure switch with the critical differential pressure, and interrupts the whole operation of the compressor/condenser unit when the inputted differential pressure is equal to or higher than the critical differential pressure.

15. The apparatus of claim 13, wherein the microcomputer transmits compressor/condenser unit interruption message to an indoor unit after interrupting the compressor/condenser unit.

16. The method of claim 15, wherein the indoor unit includes an evaporator.

17. A method for controlling an operation of compressor/condenser unit, the method comprising:
    sensing a pressure of refrigerants in an outlet of a compressor of the compressor/condenser unit;
    sensing a temperature of the refrigerants in an outlet of a condenser;
    comparing the sensed pressure and temperature with optimal pressure and temperature ranges;
    when the pressure and temperature exist within the optimal pressure and temperature ranges, maintaining the current operation conditions of a blast fan and the compressor of the compressor/condenser unit;
    when the pressure and temperature are lower than the optimal pressure and temperature ranges, increasing a revolution number of the blast fan by a predetermined value, and decreasing an operation frequency of the compressor by a predetermined value; and when the pressure and temperature are higher than the optimal pressure and temperature ranges, decreasing the revolution number of the blast fan by a predetermined value, and increasing the operation frequency of the compressor by a predetermined value.

18. The method of claim 17, further comprising setting the optimal pressure and temperature ranges under operation setup conditions of an indoor unit.

19. The method of claim 18, further comprising setting initial operation conditions of the blast fan and the compressor under the operation setup conditions of the indoor unit, and operating the blast fan and the compressor.

20. The method of claim 19, wherein the indoor unit includes an evaporator.

21. The method of claim 18, wherein the indoor unit includes an evaporator.

22. The method of claim 17, further comprising measuring a first pressure of air of the compressor/condenser unit;

comparing a critical pressure of the compressor/condenser unit with the first pressure; and interrupting the operation of the compressor/condenser unit according to the comparison result.

23. The method of claim 22, wherein measuring the first pressure comprises measuring pressure of discharged air in a discharge area of the compressor/condenser unit, and wherein the critical pressure is a reference for discharged air of the compressor/condenser unit.

24. The method of claim 23, further comprising:

measuring a second pressure of sucked air in a suction area of the compressor/condenser unit; and calculating a differential pressure between the first pressure and the second pressure.

25. The method of claim 24, further comprising comparing a critical differential pressure between the pressure of discharged air of the compressor/condenser unit and the pressure of sucked air with the differential pressure, wherein, when the differential pressure is equal to or higher than the critical differential pressure, the whole operation of the compressor/condenser unit is interrupted.

26. The method of claim 25, further comprising transmitting an compressor/condenser unit interruption message to an indoor unit after interrupting the compressor/condenser unit.

27. The method of claim 26, wherein the indoor unit includes an evaporator.

28. The method of claim 22, wherein, when the current pressure is lower than the critical pressure, interrupting the operation of the compressor/condenser unit comprises interrupting the whole operation of the compressor/condenser unit.

* * * * *